United States Patent [19]

Sampson et al.

[11] Patent Number: 4,892,852

[45] Date of Patent: Jan. 9, 1990

[54] TRANSITION METAL COMPOSITION

[75] Inventors: Roy J. Sampson, Guisborough; John W. Kelland; Frank T. Kiff, both of Middlesborough, all of England

[73] Assignee: Imperial Chemical Industries PLC, London, England

[21] Appl. No.: 180,930

[22] Filed: Apr. 13, 1988

[30] Foreign Application Priority Data

Apr. 13, 1987 [GB] United Kingdom ............... 8708810

[51] Int. Cl.$^4$ ............................................. C08F 4/64
[52] U.S. Cl. ................................... 502/107; 502/123; 502/125; 502/127; 502/133; 526/124
[58] Field of Search .............. 502/107, 123, 125, 127, 502/133

[56] References Cited

U.S. PATENT DOCUMENTS

| | | | |
|---|---|---|---|
| 3,135,809 | 6/1964 | Bosmajian | 502/103 |
| 4,439,537 | 3/1984 | Murai et al. | 502/133 X |
| 4,612,299 | 9/1986 | Arzoumanidis et al. | 502/133 X |

FOREIGN PATENT DOCUMENTS 2035338 6/1980 United Kingdom ............... 520/133

*Primary Examiner*—Patrick P. Garvin
*Attorney, Agent, or Firm*—Cushman, Darby & Cushman

[57] ABSTRACT

A transition metal composition is obtained by reacting the magnesium salt of a cycloalkyl carboxylic acid with a transition metal compound, and optionally a Lewis Base compound. The product may be used to produce an olefin polymerization catalyst by addition of for example an aluminium trialkyl and the resulting catalyst has a high activity and stereospecificity in an olefin polymerization process.

10 Claims, No Drawings

TRANSITION METAL COMPOSITION

The present invention relates to transition metal compositions, the preparation of such compositions and the use of such compositions as components of catalyst systems for the polymerisation of olefin monomers.

Transition metal compositions have been used as components of olefin polymerisation catalyst systems for many years. Compositions of this type containing titanium have been found to be especially useful, in particular for the production of polypropylene having a high stereoregularity. In recent years, considerable effort has been directed to the production of compositions which result in catalyst systems of high polymerisation activity coupled with high stereospecificity in the production of polypropylene. A catalyst system satisfying these requirements offers a propylene polymerisation process in which the removal of catalyst residues and undesirable atactic polymer is not necessary since the product of the the polymerisation process has a suitably low level both of catalyst residues and atactic polymer. To reduce the cost of the polymerisation process it has been proposed to effect the polymerisation in the essential absence of inert polymerisation diluents. In such processes, the polymerisation is effected in the monomer in the liquid phase or in the gas phase as the reaction medium. A gas phase polymerisation process is particularly demanding in respect of the catalyst performance, that is catalyst activity and stereospecificity.

Most recent developments in seeking improved catalyst performance have been directed to transition metal compositions in which a transition metal compound is reacted with a compound which may be regarded as functioning primarily as a support for the transition metal compound. There have been many proposals of systems in which titanium tetrachloride is reacted with magnesium chloride and a Lewis Base compound. Many techniques of effecting the reaction have been proposed and a wide range of Lewis Base compounds, or mixtures of Lewis Base compounds, have been used. Many of the prior art procedures disclose either the use of magnesium chloride as one of the starting materials or appear to generate magnesium chloride during the preparation of the transition metal composition. There is also considerable emphasis on the use of "active" magnesium chloride. Recent disclosures which refer to "active" magnesium chloride include, inter alia, European Patent Applications Publication No. 45975, 45976, 45977, 86471, 86472 and 106141. The characterisation of "active" magnesium chloride varies slightly but in essence an "active" magnesium chloride is one which has a surface area of at least $3m^2/g$ and/or has an X-ray diffraction pattern in which the most intense diffraction line in the spectrum of magnesium chloride of surface area one $m^2/g$ had been broadened or shifted.

We have now found that transition metal composition derived from certain magnesium carboxylates show superior properties as catalyst components to other transition metal compositions derived from the use of different magnesium carboxylates.

According to the present invention there is provided a transition metal composition which is the reaction product of a compound of a transition metal of Group IVA, VA or IVA of the Periodic Table with at least one magnesium compound of the general formula.

wherein R contains a cyclic group which is selected from substituted or unsubstituted cycloalkyl radicals; and x, y and z are integers such that yz=2x.

Preferably the composition at least one transition metal atom for every 15 atoms of magnesium, such as 9 magnesium atoms to one transition metal atom.

All references herein to the Periodic Table are to the Short Periodic Table as set out inside the back cover of "General and Inorganic Chemistry" by J R Partington, Second Edition, published by MacMillan and Company Limited, London, 1954.

The cycloalkyl radical may have 3 to 10 and preferably 6 carbon atoms in the ring. It may for example have at most 6 substituent groups which may be for example 1 to 6 carbon atom alkyl groups, halogen atoms or alkoxy groups having 1 to 6 carbon atoms.

For convenience hereafter, the term "transition metal" will be used to mean a transition metal of Group IVA, VA or VIA of the Periodic Table. The term "magnesium carboxylate" will be used hereafter to mean a magnesium compound of the general formula

The value of y is preferably from 1 to 6 and we have obtained useful results using magnesium carboxylates in which the value of y is one.

In the group or groups [R(COO)$_y$] the, or each, carboxylate group may be attached directly to a ring carbon atom of the group R.

We have obtained especially useful olefin polymerisation catalyst components using the magnesium salt of cyclohexane carboxylic acid (Mg(C$_6$H$_{11}$COO)$_2$).

The transition metal composition may also include a Lewis Base compound. The Lewis Base compound may be present in an amount which preferably does not exceed one mole of the Lewis Base compound for each mole of the transition metal compound which is present in the composition.

The Lewis Base compound is preferably an organic Lewis Base compound. A wide range of Lewis Base compounds has been proposed for use in olefin polymerisation catalyst systems and such Lewis Base compounds may be present in the transition metal composition of the present invention. The effect of any particular Lewis Base compound is dependent on the specific Lewis Base compound, the proportion of the Lewis Base compound and the other components of the polymerisation catalyst system and hence, in a particular system, some Lewis Base compounds are more effective than other Lewis Base compounds. We prefer that the Lewis Base component is obtained from a Lewis Base compound already proposed for use in a magnesium chloride supported catalyst system, for example the Lewis Base compounds used in the catalyst systems of British patent specifications Nos. 1271411, 1310547, 1387888, 1387889, 1387890, 1527736, 1540323, 1554340, 1559194, 1603724, 2000514, 2014592 and European Patent Applications Publication Nos. 45975, 45976, 45977, 86288, 86471, 86472, 86473, 86643, 86644, 86645 and 106141. We particularly prefer that the Lewis Base compound is an ester or an organo-silicon compound.

The ester is most preferably an aromatic acid ester, in particular a compound of the general formula

wherein
Ar is a residue of an aromatic hydrocarbon;
$R^1$ is a hydrocarbon radical, a halohydrocarbon radical, a halogen atom or a group $OR^3$;
$R^2$ is a hydrocarbon radical or a halohydrocarbon radical;
$R^3$ is a hydrocarbon radical or a halohydrocarbon radical;
a is 0 or an integer; and
b is an integer.

The group Ar typically is a mono- or divalent residue derived from an aromatic hydrocarbon such as benzene or naphthalene. If the group Ar is a divalent residue it may be, for example, a divalent benzene residue wherein the unoccupied valencies are in the ortho- or para-position to each other.

The, or each, group $R^1$, when present, is typically a hydrocarbon radical or a group $OR^3$, especially an alkyl or alkoxy group, particularly one containing up to 10 carbon atoms, for example an alkyl or alkoxy group containing 1 to 6 carbon atoms such as a methyl, ethyl, butyl or methoxy group.

It is preferred that at least one of the groups $R^2$ is a hydrocarbon radical. If the value of b is greater than one, the groups $R^2$ may be the same or different, for example one group $R^2$ may be a hydrogen atom and at least one group $R^2$ is a hydrocarbon radical, preferrably an alkyl group. The group $R^2$ is preferably an alkyl group containing up to 10 carbon atoms and it is especially preferred that the alkyl group contains at least 4 carbon atoms, for example ethyl, n-propyl and especially n-butyl, iso-butyl or 2-ethylhexyl groups.

The value of b is at least one but preferably does not exceed two. The value of a can be zero and it is generally preferred that the value of (a+b) does not exceed two. Especially preferred are those compounds in which the value of b is two and the groups $(COOR^2)$ are in the ortho-position to each other. Compounds of the general formula:

$$R^1{}_a Ar(COOR^2)_b$$

include methyl, ethyl and butyl benzoate, ethyl 4-methoxybenzoate, methyl 4-methylbenzoate and especially the di- esters of phthalic acid having preferably 1 to 10 carbon atoms in each alkyl group such as diethylphthalate, di-n-propyl phthalate and particularly di-n-butyl phthalate, di-iso-butyl phthalate and di-2-ethylhexyl phthalate. Di-$C_1$ to $C_{10}$ alkyl esters of phthalic acid are preferred.

Organic silicon compounds which may be present include compounds containing one or more Si—$OR^4$, Si—$OCOR^4$ or Si—$NR^4$ bonds, wherein $R^4$ is a hydrocarbon radical which may be substituted with one or more halogen atoms and/or hydrocarbonoxy groups.

Preferably the organic silicon compound is a dihydrocarbyl for example a diphenyl or dialkyl dialkoxy silane, and more preferably a di$C_{1-10}$ alkyl dimethoxy silane.

Other organic silicon compounds which may be present as the Lewis Base component include phenyltriethoxysilane, diphenyldiisobutoxysilane, diphenyldimethoxysilane and iso-butyl-triethoxysilane.

In the transition metal composition of the present invention, the transition metal is preferably titanium. It is particularly preferred that the transition metal compound used to obtain the transition metal composition is a titanium halide for example titanium tetrahalide, especially titanium tri or preferably tetrachloride.

Thus, as a preferred aspect, the transition metal composition of the present invention is the reaction product of titanium tetrachloride and a magnesium compound of the general formula $$Mg_x[R(COO)_y]_z$$

where R, x, y and z are all as defined herein.

Preferred transition metal compositions in accordance with the present invention contain titanium, magnesium and chlorine and are active and stereospecific when used for the polymerisation of an olefin monomer such as propylene as hereinafter described.

As a further aspect of the present invention, there is provided a process for the production of a transition metal composition which comprises reacting, at a temperature of at least 50° C., a compound of a transition metal of Group IVA, VA or VIA of the Periodic Table with a magnesium compound of the general formula $$Mg_x[R(COO)_y]_z$$

The reaction is preferably effected by suspending the magnesium carboxylate in a liquid medium which is, or which contains, a transition metal compound.

As will be discussed in more detail hereafter, a Lewis Base compound is preferably used in the process.

The reaction with the transition metal compound may be effected in one or more stages. The, or each, reaction stage is effected at a temperature, of at least 50° C., which is preferably at least 75° C. The reaction temperature may be as high as the boiling temperature of the liquid medium. Thus, if reaction is effected in undiluted titanium tetrachloride under ambient pressure, the temperature can be as high as about 136° C., but in general a temperature of up to 110° C. is preferred, for example about 100° C. Particularly useful results are obtained using a reaction temperature of from 80° C. The reaction is preferably effected for a total time, of all reaction stages, of at least 0.5 hours and typically at least two hours. The reaction time preferably does not exceed a total of 100 hours and in general is less than 50 hours, typically two to 50 hours. The proportion of the transition metal compound which is used is preferably at least one mole for each mole of the magnesium carboxylate and it is especially preferred to use a molar excess of the transition metal compound relative to the magnesium carboxylate.

The magnesium carboxylate may be contacted with the Lewis Base compound before effecting the reaction with the transition metal compound. The Lewis Base compound may be used in an amount of up to 5 moles of Lewis Base compound for each mole of the magnesium carboxylate. In general it is preferred that the proportion of the Lewis Base compound does not exceed one mole, and is especially not more than 0.5 mole, for example about 0.33 mole for each mole of the magnesium carboxylate.

The contacting may be effected by suspending the magnesium carboxylate in a solution of the Lewis Base compound in a suitable solvent and agitating the mixture for a period of time which is preferably at least 0.5 hours but generally does not exceed 10 hours, for example 1 to 4 hours. Suitable solvents for effecting the contacting are aliphatic and aromatic hydrocarbons or chlorohydrocarbons such as 1,2-dichloroethane. If the contacting is effected using a solution of the Lewis Base, contacting is preferably effected at a temperature of at least 50° C. and preferably at least 75° C. The contacting may be effected at temperatures as high as about 136° C. but in general a temperature of up to 110° is preferred, for example up to about 100° C. Conveniently, the contacting is effected at the boiling point of the reaction mixture, for example about 84° C. using 1,2-dichloroethane as the solvent. However, when using magnesium cyclohexylcarboxylate, reaction with the Lewis Base compound is conveniently effected simultaneously with the reaction with the transition metal compound.

The reaction with the transition metal compound is preferably effected using an excess of the transition metal compound relative to the magnesium carboxylate. The reaction is conveniently effected by suspending the magnesium carboxylate in undiluted liquid transition metal compound, preferably titanium tetrachloride and agitating the mixture at a suitable temperature for a time sufficient to achieve the necessary reaction. The reaction may be effected in more than one stage, using a fresh sample of the transition metal compound for each stage.

The amount of transition metal compound used for each stage is conveniently at least two and preferably at least five moles for each mole of the magnesium carboxylate. However, substantially greater proportions of transition metal compound may be used, for example up to 60 moles of transition metal compound for each mole of the magnesium carboxylate. In general a satisfactory excess of transition metal compound is obtained using at least 2 cm$^3$ of undiluted titanium tetrachloride for each gramme of the magnesium carboxylate and in particular from 3 up to 20 cm$^3$ of titanium tetrachloride for each gramme of the magnesium carboxylate. When the reaction has been completed, the excess transition metal compound is preferably removed from the reaction mixture whilst still at an elevated temperature, particularly at a temperature of at least 80° C. The excess liquid can be removed using any suitable technique, for example filtration, decantation, syphoning or centrifuging.

The reaction with the transition metal compound is preferably effected using an undiluted liquid transition metal compound but reaction can be effected using a solution of the transition metal compound in a suitable solvent, particularly an inert material such as an inert hydrocarbon or halohydrocarbon liquid, especially an aliphatic hydrocarbon. If a solution of titanium tetrachloride is used, preferably such a solution contains at least 25%, and especially at least 45% by weight of titanium tetrachloride.

The Lewis Base compound is conveniently added in a solution comprising the transition metal compound which is used to treat the magnesium carboxylate or is added to a preformed mixture of the magnesium carboxylate and the transition metal compound. The Lewis Base compound is preferably used in an amount of not more than one mole for each mole of the transition metal compound. The amount of Lewis Base compound which is used is preferably sufficient to give a reaction product containing from 0.001 up to 0.5 moles of Lewis Base compound for each gram atom of the transition metal. It is especially preferred that the Lewis Base compound is used in an amount sufficient to give 0.01 up to 0.2 moles of Lewis Base compound for each gram atom of transition metal.

Once the reaction with the transition metal compound and the optional Lewis Base compound has been effected, the reaction product is preferably washed to remove by-products. The liquid medium used to effect the washing is conveniently an inert hydrocarbon or halohydrocarbon. Suitable inert liquids include hexane, heptane, octane, decane, dodecane and mixtures of the isomers thereof, aromatic liquids such as benzene and toluene, and halohydrocarbons such as 1,2-dichloroethane and chlorobenzene. The washing is conveniently effected by suspending the reaction product in the inert liquid hydrocarbon or halohydrocarbon medium and agitating the mixture for a period of time of at least 5 minutes up to 10 hours conveniently 10 minutes up to 5 hours. The number of washing steps will depend on the quantity of the inert liquid hydrocarbon or halohydrocarbon used in each washing step, the time and temperature of each washing step, and the nature of the reaction mixture. It is generally preferred to use at least two, and not more than five, washes. The washing step may be effected at ambient temperature but it is preferred that at least one washing step is effected under conditions such that the inert liquid hydrocarbon or halohydrocarbon attains an elevated temperature which is in the range 60° C. up to 120° C., and especially at least 80° C.

The at least one washing step is believed to remove some complexes of the transition metal compound and the optional Lewis Base compound from the reaction product and also to remove any excess unreacted transition metal compound which remains. For the removal of the complexes, it is desirable that the at least one washing step, and particularly at least the first washing step when several washing steps are used, is effected at an elevated temperature of at least 60° C., particularly at least 80° C. However, if more than one washing step is used, the washing steps after the first step may be effected at a lower temperature. It is preferred to effect the washing step, or the first washing step, before any substantial cooling has occurred after separating the reaction product from the transition metal compound. Thus, it is preferred to add hot inert hydrocarbon or halohydrocarbon liquid to the separated solid reaction product within a few minutes, for example within one to 30 minutes, of removing the transition metal compound. The at least one washing step is conveniently effected in a vessel containing heating means, such as an outer jacket for a heating fluid, and it is preferred to continue heating during the washing step or during at least the first of the washing steps. After the reaction with the transition metal compound, the washing may be effected without allowing any appreciable cooling of the separated solid reaction product to occur and adding the inert hydrocarbon or halohydrocarbon liquid at ambient temperature whilst still supplying heat to the solid, and the added liquid. The washing step, or each washing step, is effected by suspending the solid reaction product in the inert hydrocarbon or halohydrocarbon liquid and agitating the mixture for a period of time which may be from 5 minutes up to 10 hours, and which is preferably from 10 minutes up to 5 hours. Alternatively, continuous washing may be effected, for example using a centrifuge.

The quantity of the inert hydrocarbon or halohydrocarbon liquid used for the at least one washing step is conveniently in the range from 5 cm$^3$ to 50 cm$^3$ for each gramme of the solid reaction product, particularly from 8 cm$^3$ to 20 cm$^3$ for each gramme of the solid reaction product.

We have found that the transition metal composition of the present invention may be used in combination with organic metal compounds, and preferably Lewis Base compounds, to give a polymerisation catalyst and that this catalyst has a high activity and stereospecificity when used for the polymerisation of alpha-olefin monomers.

According to a further aspect of the present invention there is provided a polymerisation catalyst which comprises A. A transition metal composition as hereinbefore defined or obtained by the process hereinbefore described; and B. an organic compound of aluminium and/or of a non-transition metal of Group IIA of the Period Table, for example a complex of an organic compound of a non-transition metal of Group IA or IIA or the Periodic Table together with an organic aluminium compound.

Component B of the catalyst system may be an organic magnesium compound or a mixture or complex thereof with an organic aluminium compound. Alternatively, a complex of a metal of Group IA with an organic aluminium compound may be used, for example, a compound of the type lithium aluminium tetraalkyl. However, it is preferred to use an organic aluminium compound and in particular it is preferred to use a trihydrocarbon aluminium compound such as an aluminium trialkyl compound, particularly one in which the alkyl group contains from 1 up to 10 carbon atoms, for example, aluminium triethyl, aluminium triisobutyl or aluminium trioctyl.

In addition to any Lewis base incorporated into catalyst component (A) it is preferred to provide a Lewis base (II) component.

The Lewis Base II compound can be any orgainc Lewis Base compound which has been proposed for use in a Ziegler polymerisation catalyst and which affects either the activity or stereospecificity of such a catalyst system. Thus, the Lewis Base compound may be an ether, an ester, a ketone, an alcohol, an ortho-ester, a sulphide (a thioether), an ester of a thiocarboxylic acid (a thioester), a thioketone, a thiol, a sulphone, a sulphonamide, a fused ring compound containing a heterocyclic sulphur atom, an organic silicon compound such as a silane or siloxane, an amine, a urea, substituted ureas, thiourea, amines and derivatives thereof, and organic phosphorus compounds.

The Lewis Base II component of the catalyst system may be a Lewis Base compound of the type preferred as the optional Lewis Base component in Component A of the catalyst system. Thus, the Lewis Base component may be an ester of the formula $R^1_a Ar(COOR^2)_b$ where $R^1$, $R^2$, a and b are all as hereinbefore defined. Esters which may be used as the Lewis Base II component of the catalyst system include, for example, diethyl phthalate, ethyl benzoate, butyl benzoate, methyl 4-methylbenzoate, ethyl 4-methoxybenzoate and ethyl phenylacetate.

Preferably the Lewis Base II component may be an organic silicon compond, particularly one containing one or more $Si-OR^4$, $Si-OCOR^4$ or $Si-NR^4$ bonds, where $R^4$ is as hereinbefore defined and is preferably a dihyrocarbyl, preferably a diphenyl or dialkyl dialkoxy silane and more preferably a di $C_2$ to $C_{10}$ alkyl dimethoxy silane. Other organic silicon compounds which may be used include phenyltriethoxysilane, diphenyldiisobutoxysilane, diphenyldimethoxysilane and isobutyltriethoxysilane. The use of such organic silicon compounds is particularly preferred when component A of the catalyst system contains a phthalate as its Lewis Base component.

In the polymerisation catalyst it is preferred to use at least one mole of the organic metal compound which is Component B for each gram atom of transition metal which is present in Component A of the catalyst system. In general at least 10 moles of the organic metal compound are used for each gram atom of transition metal but the proportion of Component B preferably does not exceed 250 moles per gram atom of transition metal in Component A. Especially preferred proportions of Component B are from 10 up to 60 moles of the organic metal compound for each gram atom of transition metal.

The proportion of Lewis Base II compound should not exceed the proportion of Component B of the catalyst system. Preferably, when the Lewis Base II compound is an ester, there is used from 0.01 up to 0.5 moles, especially from 0.05 up to 0.4 moles, of the ester for each mole of Component B. If the Lewis Base II compound is a silicon compound, it is preferred to use 0.01 up to 0.5, especially 0.05 up to 0.4, for example 0.1 moles of the silicon compound for each mole of component B.

The catalyst system of the present invention may be obtained by pre-mixing Components A, B and optional Lewis Base II before introducing the catalyst system into the polymerisation process. Alternatively, all the catalyst components may be introduced separately into the polymerisation process.

The catalyst systems of the present invention are suitable for the polymerisation or copolymerisation of unsaturated monomers, particularly ethylenically unsaturated hydrocarbon monomers such as the olefin monomers.

As a further aspect of the present invention there is provided a process for the production of a polymer or copolymer of an unsaturated monomer wherein at least one unsaturated hydrocarbon monomer is contacted under polymerisation conditions with a polymerisation catalyst as hereinbefore described.

The monomer which may be used in accordance with the present invention has the formula $CH_2=CHR^5$ wherein $R^5$ is a hydrogen atom or a hydrocarbon radical.

Thus, the monomers which may be polymerised by the process of the present invention include ethylene, propylene, butene-1, pentene-1, hexene-1, 4-methylpentene-1, styrene, 1,3-butadiene or any other monomer having the above formula. The monomer is preferably an olefin monomer, particularly an aliphatic mono-olefin monomer which contains from 2 up to 10 carbon atoms.

The monomers may be homopolymerised or may be copolymerised together. If a copolymerisation is being effected this may be done using a mixture of monomers which has essentially the same composition throughout the polymerisation process. Alternatively, a sequential polymerisation process, such as described in British Pat. Nos. 970478 and 970479 may be used, for example by polymerising propylene alone and thereafter polymerising a mixture of propylene and ethylene to give a polymer product which contains from 2 up to 30% by weight of ethylene.

The present invention is particularly suitable for the polymerisation of ethylene or propylene, and especially for the polymerisation or copolymerisation of propylene in the gas phase.

Thus, as a further aspect of the present invention there is provided a process for the polymerisation of propylene which comprises contacting gaseous propylene with a polymerisation catalyst of the type hereinbefore described and optionally thereafter contacting the polymer product with a gaseous mixture of propylene and ethylene.

Using the process of the present invention, it is possible to obtain, as a direct product of polymerisation, a propylene polymer having a titanium content of not more than 10 part per million by weight, especially less than 5 parts per million by weight. Preferred propylene homopolymers contain not more than 7%, and especially less than 5% by weight of polymer which is soluble in boiling heptane.

Propylene polymers obtained by the present invention can have a chlorine content which is not more than 100 parts per million, particularly not more than 50 parts per million and especially not more than 30 parts per million by weight. The homopolymer may be formed into mouldings which have a flexural modulus of more than 1.40 $GN/m^2$ and especially at least 1.5 $GN/m^2$. The flexural modulus is determined from the deformation of a test strip at 1% skin strain after 60 seconds at 23° C. and 50% relative humidity measured using a cantilever beam apparatus as described in "Polymer Age", March 1970, pages 57 and 58, using a test strip at prepared as described in the detail hereafter in Note (p) to Table Six.

The low proportion of polymer which is soluble in boiling heptane and the high flexural modulus both indicate the high stereoregularity of the propylene polymers of the present invention.

The process of the present invention may also be used to sequentially polymerise propylene and ethylene to obtain sequential complymers having a useful combination of properties.

If polymerisation is effected in the gas phase, propylene monomer may be introduced into the polymerisation vessel as a liquid with the conditions of temperature and pressure within the polymerisation vessel being such that a major proportion of the liquid propylene vaporises, thereby giving an evaporative cooling effect, whereby the polymerisation vessel contains a solid phase which is the polymerisation catalyst and the polymer formed thereon and a gaseous monomer phase with only a minor proportion of liquid monomer. Polymerisation in the gas phase may be effected using conditions which are such that the monomer is at a temperature and partial pressure which are close to the dew point temperature and pressure for that monomer, for example, as described in more detail in British patent specification No. 1532445. Polymerisation in the gas phase may be effected using any technqiue suitable for effecting a gas-solid reaction, such as a fluidised-bed reactor system, a stirred-bed reactor system or a ribbon-blender type of reactor.

It will be appreciated that the catalyst system hereinbefore described is of the type generally known as a Ziegler-Natta catalyst system. As is well known, Ziegler-Natta catalysts are susceptible to the presence of impurities in the polymerisation system. Accordingly, particularly when a high yield of polymer is desired in relation to the transition metal component of the catalyst system, it is desirable to effect the polymerisation using reagents, that is monomer and possibly diluent, which have a high degree of purity, for example, a monomer which contains less than 5 ppm by weight of water and less than 1 ppm by weight of oxygen. Materials having a high degree of purity can be obtained by processes such as those described in British patent specification Nos. 1111493, 1226659 and 1383611.

The polymerisation may be effected either in a batch manner or on a continuous basis. When the monomer is propylene or a higher alpha-olefin monomer, it is preferred that the polymerisation is effected in the presence of a Lewis Base compound.

When carrying out polymerisation on a continuous basis, the organic metal compound and the Lewis Base compound may be pre-mixed just before being introduced into the polymerisation reaction vessel.

It has been found that it is often advantageous to perform a pre-polymerisation step in which the monomer is fed to the catalyst system to produce a "prepolymer" at a temperature lower than that of the main polymerisation. Typically, 1 to 100 g of polymer is produced at this stage for each g of the transition metal composition.

The polymerisation can be effected in the presence of a chain transfer agent such as hydrogen in order to control the molecular weight of the polymer product. The proportion of chain transfer agent used will be dependent on the polymerisation conditions and on the particular monomer or monomer mixture which is being polymerised. Using hydrogen in the polymerisation of propylene, it is preferred to use hydrogen in a proportion of from 0.01 up to 5.0%, particularly from 0.05 up to 2.0% molar relative to the monomer. However, when the monomer being polymerised is ethylene, or a mixture in which ethylene is a major polymerisable component (by moles), the amount of hydrogen used is typically much greater, for example, in the homopolymerisation of ethylene the reaction mixture may contain in excess of 50% molar of hydrogen, whereas if ethylene is being compolymerised, the proportion of hydrogen present is typically up to 35% molar of the total reaction mixture.

The polymerisation can be effected under any conditions which have been previously proposed for effecting the polymerisation of olefin monomers. Thus, ethylene polymerisation may be effected at pressures of up to 3000 $kg/cm^2$, and at such pressures the polymerisation temperature may be as high as 300° C. However, it is preferred to carry out the polymerisation at comparatively low pressures and temperatures, particularly for the production of polymers of the higher olefins (including propylene) which have a high stereoregularity. More specifically, the polymerisation is effected at pressures which are conveniently in the range from 1 up 100 $kg/cm^2$, preferably at a pressure of up to 50 $kg/cm^2$ and especially at pressures in the range from 5 up to 40 $kg/cm^2$.

The polymerisation temperature used will be dependent in part on the particular polymerisation technique being used. Thus, it is possible to use polymerisation temperatures in excess of the melting point of the polymer and such conditions may be used in the polymerisation, or copolymerisation, of ethylene in the presence of a hydrocarbon liquid which can act as a solvent for the polymer formed. However, in general, it is preferred to use temperatures below the melting temperature of the polymer formed and in particular it is preferred to use temperatures of not more than 100° C. The polymerisation temperature is typically in the range from 40° C. up to 100° C.

It is generally preferred to effect all stages in the preparation of the transtion metal composition in an inert atmosphere atmosphere which is essentially free from oxygen-containing impurities such as water vapour. Very preferably the polymerisation process of the present invention should also be effected in the essential absence of such impurities since these can have a harmful effect on the polymerisation process.

High molecular weight polymers may be obtained by the process of the present invention as indicated by the melt flow index of the polymer, which is typically in the range from 0.01 up to 1000. For propylene polymers, including copolymers, the melt flow index is measured by ASTM Test Method D1238/70, using a temperature of 190° C. and a weight of 10 kg.

Various aspects of the present invention will now be described with reference to the following Examples which are illustrative of the invention. In the Examples, all operations are effected under an atmosphere of essentially oxygen- and water-free nitrogen unless otherwise indicated. All the glass apparatus was dried in air oven at 120° C. for at least one hour and purged with nitrogen before use.

In the propylene polymerisation examples, the propylene used for the polymerisation had been purified further by passing gaseous propylene of commerical purity through a column containing granules of Alcoa F1 alumina at ambient temperature.

EXAMPLES

Production of Magnesium Cyclohexylcarboxylate ($Mg(C_6H_{11}COO)_2$)

128g of cyclohexylcarboxylic acid was added to a three $dm^3$ flask containing 400 $cm^3$ of methanol and 600 $cm^3$ of water. This mixture was stirred whilst 12.2 g of magnesium metal were added over a period of one hour. The mixture was left stirring overnight, during which time most of the magnesium had been consumed and a white precipitate of magnesium cyclohexylcarboxylate was produced. The flask was then warmed to 60° C. with stirring and the precipitate dissolved to give a clear solution. The clear solution was filtered (leaving behind about 0.5 g of magnesium) the filtrate was set aside to crystallise. Two crops of crystals were recovered having a total weight, after drying, of 125 g. The magnesium cyclohexylcarboxylate was dried in an oven for 2 hours at 120° C., and then stored under nitrogen. This will be identified as MgCR.

EXAMPLE 1

15 g of magnesium cyclohexylcarboxylate were placed in a 600 $cm^3$ reaction vessel provided with a stirrer and containing a nitrogen atmosphere. 300 $cm^3$ of titanium tetrachloride were added to the reaction vessel and the contents of the vessel were stirred and heated up to 84° C. When the temperature of 84° C. was attained, diisooctylphthalate was added in the proportion of three moles of the magnesium cyclohexylcarboxylate to one mole of the diisooctylphthalate. The mixture was stirred at 84° C. for two hours and the stirrer was then switched off and the solid allowed to settle. After two hours, the supernatant titanium tetrachloride was decanted off, an equivalent volume (that is 300 $cm^3$) of fresh titanium tetrachloride was added and the mixture was stirred. The temperature was maintained at 84° C. and stirring was continued for one hour. Stirring was then stopped and the solid was allowed to settle for one hour. The supernatant liquid was decanted off and a corresponding quantity (300 $cm^3$) of n-heptane (BDH AR n-heptane) was added and the mixture was stirred at 84° C. for an hour. The stirring was stopped, the solid allowed to settle and the supernatant liquid was decanted off. Washing with heptane was carried out a further three times.

EXAMPLES 2 to 5

The procedure of Example 1 was repeated with variations in the proportions of the reagents used and also with the addition of a quantity of heptane to the mixture at the end of the first titanium tetrachloride treatment, just before stirring was stopped, and a supernatant mixture of heptane and titanium tetrachloride was decanted off. In Example 5, the reaction was carried out using 210 g of magnesium cyclohexylcarboxylate and a 6 $dm^3$ reaction vessel. The procedure was used in each of the Examples is set out in Table One.

TABLE ONE

| Example | Mg/ester (s) | $TiCl_4$ ($cm^3$) | Heptane ($cm^3$) | $TiCl_4$ ($cm^3$) | Heptane ($cm^3$)(i) |
|---|---|---|---|---|---|
| 1 | 3 | 300 | NIL | 300 | 3 × 400 |
| 2 | 3 | 300 | 300 | 300 | 3 × 400 |
| 3 | 3 | 300 | 40 | 300 | 3 × 400 |
| 4 | 1 | 300 | 40 | 300 | 3 × 400 |
| 5 | 3 | 3200 | 400 | 2500 | 5 × 4300 |

Notes to Table one
(i)The first number indicates the number of washes effected and the second number indicates the volume $cm^3$ of heptane added.
(s)Molar ratio of magnesium cyclohexylcarboxylate to diisooctylphthalate.

EXAMPLES 6 to 14

The products of Examples 1, 3, 4, and 5 were used to effect the polymerisation of liquid propylene. 10 millimoles of aluminium triethyl, 1 millimole of dimethoxydiphenylsilane and the product of Examples 1 (or, in examples 9 to 14 the product of examples 3 to 5) in amount to provide 0.1 to 0.5 millimole of titanium were added to a 8 $dm^3$ stirred stainless steel autoclave under nitrogen and at ambient temperature. 5.5 $dm^3$ of liquid propylene were then added and the autoclave was maintained, with stirring, at 20° C. for 15 minutes. The temperature was then raised to 70° C. over a period of 15 minutes. Hydrogen was then added. The mixture was stirred at 70° C. for a period of one hour, the autoclave was then vented and the polypropylene powder produced was recovered.

Further details of the polymerisation conditions are set out in Table Two together with properties of the polymer products obtained.

TABLE TWO

| Eg | TMC Type (1) | A/S (m) | MFI (n) | Ti (o) | Al (o) | Cl (o) | FM (p) | HHS (q) |
|---|---|---|---|---|---|---|---|---|
| 6 | 1 | 10:1 | 15 | 5.2 | 255 | 28 | 1.57 | 4.1 |
| 7 | 1 | 5:1 | 16 | 6.1 | 622 | 63 | 1.77 | 6.5 |
| 8 | 1 | 10:1 | 60 | 2.4 | 878 | 26 | 1.59 | 4.9 |
| 9 | 3 | 10:1 | 97 | 0.9 | 332 | 8.1 | 1.76 | 4.77 |
| 10 | 3 | 5:1 | 63 | 1.0 | 327 | 12.8 | 1.68 | 2.8 |
| 11 | 3 | 10:1 | 35 | 1.0 | 638 | 15.0 | 1.43 | 2.6 |
| 12 | 4 | 10:1 | 14.5 | 1.0 | 512 | 17.3 | 1.58 | 2.9 |
| 13 | 5 | 10:1 | 14 | 1.3 | 680 | 23 | 1.61 | 1.70 |

TABLE TWO-continued

| Eg | TMC Type (l) | A/S (m) | MFI (n) | Ti (o) | Al (o) | Cl (o) | FM (p) | HHS (q) |
|---|---|---|---|---|---|---|---|---|
| 14 | 5 | 5:1 | 22 | 1.7 | 511 | 25 | 1.51 | 1.61 |

Notes to Table Two
(l)TMC is the transition metal composition produced by the process of the Example noted.
(m)A/S is the molar ratio of added aluminum triethyl to added phenyltriethoxysilane.
(n)MFI is the melt flow index measured by ASTM Test Method D 1238/70, using a temperature of 190° C. and a weight of 10 kg.
(o)The titanium (Ti), aluminum (Al) and chlorine (Cl) residues from the catalyst are given in parts per million by weight relative to the total polymer product (polymer + catalyst residues) and were measured using neutron activation on polymer powders.
(p)FM is the flexural modulus expressed in $GN/m^2$. The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip which had dimensions of approximately 150 × 19 × 1.6 mm, was prepared in the following manner.
23 g of the polymer were mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminum foil and pressed by means of an electric Tangye press at a temperature of 250° C. The pressing was pre-heated for a period of 6 minutes, under just enough pressure to make the polymer flow across the template, that is an applied force of about 1 tonne. After the pre-heat period, the applied force was raised to 15 tonne in 5 tonne increments, degassing (that is releasing pressure) every 5 tonnes. After 2 minutes at 15 tonnes, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C. and after 2 hours at this temperature the heat was switched off and the oven cooled to ambient temperature at 15° C. per hour.
(q)HHS is the proportion by weight of the polymer which is soluble in boiling heptane as determined from the weight loss of a sample of polymer after Soxhlet extraction with the heptane fraction for 24 hours.

EXAMPLES 15 to 31

The transition metal composition of Example 5 was used to effect the polymerisation of propylene in the gas phase as follows.

Propylene was polymerised continuously in the gas phase as described hereafter. To initiate the polymerisation, the reaction vessel initially contained about 5 kg of polypropylene powder having a flexural modulus of 1.45 $GN/m^2$, and containing 4% by weight of polymer soluble in the heptane fraction by Soxhlet extraction for 24 hours.

Polymerisation was effected in a 25 $dm^3$ stainless steel autoclave fitted with a stirrer and having a heating jacket. Initially, the polypropylene powder was placed in the autoclave. The pressure was reduced to 75 millibars and then nitrogen was added to a pressure of one bar, this procedure being carried out a total of three times. The stirrer was rotated at 60 rpm and stirring was continued throughout the following procedure. The autoclave was heated up to 80° C. and then evacuated to a pressure of 75 millibars. Liquid propylene was added to the autoclave and vaporised to rise the pressure to 28 $kg/cm^2$ gauge. Hydrogen was added separately in the proportion of 1.5% by weight relative to the propylene.

Equal volumes of a 1.5M solution of tri-ethyl aluminium in the aliphatic hydrocarbon diluent and a 0.6M solution of phenyltriethoxysilane in the aliphatic hydrocarbon were pumped into the autoclave from separate vessels, the liquid streams being mixed together just before entry into the autoclave. A suspension in the heptane fraction containing the transition metal composition and having a solids content of about 50% by weight was also introduced into the autoclave. The mixture of the aluminium compound and the ester, and the suspension of the titanium composition were added until polymerisation was observed to start. Liquid propylene was being introduced, and gaseous propylene vented off, whilst the catalyst was being added.

Once polymerisation had started, venting of the autoclave was stopped, liquid propylene at 20° C. was introduced into the autoclave at a rate to maintain a pressure of 28 $kg/cm^2$ gauge, (about 3 kg/hr) and polypropylene, saturated with propylene, was intermittently withdrawn from the autoclave at a desired rate, typically about 2.5 kg of polymer per hour. The temperature and pressure were maintained at 80° C. to 85° C. and 28 $kg/cm^2$ gauge respectively. The mixture of the trialkyl aluminium compound and the ester was continuously introduced into the autoclave at a rate corresponding to 18 millimoles per hour of the aluminium compound. The suspension of the transition metal composition was continuously introduced into the autoclave at a rate sufficient to produce 2.5 to 3 kg of polymer per hour.

During the operation of the autoclave, the nature of the transition metal composition was changed and operation of the autoclave was continued using various different transition metal composition.

Further details of the polymerisation conditions are set out in Table Three together with the properties of the polymer products removed at various times during the polymerisations.

TABLE THREE

| Eg | Time (r) | A/S (m) (u) | MFI (n) | Ti (o) | Al (o) | Cl (o) | FM (p) | HHs (q) |
|---|---|---|---|---|---|---|---|---|
| 15 | 12* | — | 13.6 | 1.41 | 74.2 | 24.6 | 1.53 | 2.42 |
| 16 | 36* | — | 39.2 | 1.47 | 93.2 | 26.0 | 1.38 | 2.43 |
| 17 | 20* | 10:1 | 23 | 1.95 | 98.1 | 31.5 | 1.53 | 1.63 |
| 18 | 22* | 10:1 | 25 | ND | ND | ND | 1.64 | 1.28 |
| 19 | 24* | 10:1 | 20.3 | 1.94 | 81.4 | 26.4 | 1.63 | 1.33 |
| 20 | 20* | 5:1 | 21.9 | 2.18 | 93.6 | 31.3 | 1.46 | 0.87 |
| 21 | 22* | 5:1 | 19.6 | 1.76 | 92.6 | 30.6 | 1.61 | 1.25 |
| 22 | 24* | 5:1 | 22.6 | 1.57 | 99.3 | 29.3 | 1.54 | 1.02 |
| 23 | 30* | 20:1* | 28.7 | 2.23 | 178 | 36.9 | 1.49 | ND |
| 24 | 32* | 20:1* | 24.4 | 2.71 | 182 | 38.2 | 1.50 | 1.33 |
| 25 | 34* | 20:1* | 30.6 | 2.08 | 176 | 35.7 | 1.54 | ND |
| 26 | 20 | 10:1 | 21.8 | 3.01 | 101 | 39.3 | 1.52 | 7.42 |
| 27 | 22 | 10:1 | 23.4 | 3.00 | 88.9 | 38.0 | 1.00 | 5.61 |
| 28 | 24 | 10:1 | 19.6 | 2.16 | 85.5 | 36.7 | 1.38 | 4.52 |
| 29 | 20 | 5:1 | 15.4 | 2.26 | 88.8 | 34.1 | 1.59 | ND |
| 30 | 22 | 5:1 | 11.1 | 2.47 | 91.4 | 33.5 | 1.44 | 2.63 |
| 31 | 24 | 5:1 | 13.8 | 2.25 | 89.4 | 35.8 | 1.52 | ND |

Notes to Table Three
(m), (n), (o), (p) and (q) are all as defined previously for Table Two.
(r)The time of removing the polymer sample measured in hours from the commencement of using the specified catalyst system.
*The catalyst system used had been subjected to a prepolymerisation treatment as follows. Pre-polymerisation was effected using a suspension of the catalyst in a liquid hydrocarbon mixture consisting essentially of pentamethylheptane isomers. Pre-polymerisation at a temperature of 20° C. and a propylene pressure of 1 $kg/cm^2$ was effected for a sufficient time to produce 3 g of polymer for each gramme of the product of Example 5. The catalyst system consisted of aluminum triethyl, dimethoxydiphenylsilane and the product of Example 5 in the molar proportions of 3:3:1 based on the titanium content of the product of Example 5.
(u)*These examples used 36 mM/hour of aluminum tri-ethyl.

EXAMPLE 32

The procedure of Example 1 was repeated with the following variations.

30 g of magnesium cyclohexylcarboxylate were mixed, with stirring, with 300 $cm^3$ of titanium tetrachloride. The mixture was then allowed to stand overnight (about 17 hours) without heating. The mixture was stirred and heated up to 84° C. On attaining 84° C., 5.7 $cm^3$ of di-isooctylphthalate were added (1 mole of phthalate per 5 g atoms of magnesium). After 1.75 hours at 84° C., 30 $cm^3$ of heptane were added over a period of ten minutes, the stirrer was turned off and the solid was allowed to settle over a period of two hours whilst maintaining the temperature at 84° C. The supernatant liquid was then siphoned off.

The mixture was stirred and 200 cm³ of heptane was added slowly. After 0.5 hours, the stirrer was turned off and the solid was allowed to settle over a period of 0.5 hours whilst maintaining the temperature at 84° C. The supernatant liquid was then siphoned off. This washing procedure was repeated a further three times using 240 cm³, 260 cm³ and 250 cm³ of heptane respectively. The settled residue had a volume of about 50 cm³ and the product was brown.

EXAMPLE 33

23 g of magnesium cyclohexylcarboxylate were transferred into a 600 ml reaction vessel provided with a stirrer and containing a nitrogen atmosphere. 100 ml of titanium tetrachloride were added to the reaction vessel and the contents of the vessel were stirred and heated up to 84° C. When the temperature of 84° C. was attained, diisooctylphathalate was added in the proportion of five moles of the magnesium cyclohexylcarboxylate to one mole of the phthalate. After stirring the slurry at 84° C. for 30 minutes, 20 ml heptane were slowly added. This slurry was then stirred at 84° C. for an additional 45 minutes when the stirrer was switched off. Two hours later the supernatant TiCl₄ was decanted off and 250 ml of toluene were added, slowly, with stirring. The stirrer was switched off after 30 minutes and the supernatant liquor decanted off. This was repeated with a further 170 ml of toluene. Then the catalyst slurry was washed twice with heptane at 84° C. by decantion.

EXAMPLE 34

20 g of Grace Davison 952 silica were transferred into a 600 ml reaction vessel provided with a stirrer and containing a nitrogen atmosphere. 4.5 g of magnesium cyclohexylcarboxylate were added, followed by 200 ml of heptane, then the stirrer was switched on. After stirring for 30 minutes the stirrer was switched off and the slurry was allowed to settle when the supernatant heptane was decanted off.

300 ml TiCl₄ were then transferred into the reactor and the heater and stirrer switched on. When 84° C. was reached 2 ml of diisooctylphthalate were added. 5 minutes late the stirrer was switched off and the slurry allowed to settle. 30 minutes later the supernatant TiCl₄ was decanted off and 320 ml of heptane were added, slowly, with stirring. After 10 minutes the stirrer was switched off and the catalyst allowed to settle when the supernatant heptane was decanted off. This was repeated a further three times with 300 ml aliquots of heptane to wash the catalyst.

EXAMPLES 35 to 38

The products of Example 32-34 were used to effect the polymerisation of liquid propylene as described for Examples 6 to 14.

Details of the polymerisation conditions, and some properties of the polymer products, are set out in Table Four.

The polymer produced through the proceedure of Example 38 has a spheroidal particle form, has a narrow particle size distribution closely centred on 1.5 mm, 2 is without material of less than 125 u.

TABLE FOUR

| Eg | TMC Type (l) | A/S (m) | MFI (n) | Ti (o) | Al (o) | Cl (o) | FM (p) | HHS (q) |
|----|----|----|----|----|----|----|----|----|
| 35 | 32 | 10 | 33 | 2.4 | 381 | 28 | 1.48 | 4.0 |
| 36 | 32 | 5 | 28 | 2.8 | 355 | 29 | 1.50 | 3.8 |
| 37 | 33 | 10 | 74 | 0.8 | 168 | 12 | 1.61 | 3.7 |
| 38 | 34 | 10 | 36 | 2.2 | 320 | 17 | 1.55 | 1.7 |

Notes to Table Four
(l), (m), (n), (o), (p) and (q) are all as defined in previously for Table Two.

We claim:

1. A transition metal composition which is the reaction product of a compound of a transition metal of Group IVA, VA or VIA of the Periodic Table with a magnesium compound of the general formula $$Mg_x(R(COO)_y)_z$$

wherein
R is unsubstituted cycloalkyl or cycloalkyl substituted with one or more halogen atoms, alkyl groups containing 1 to 6 carbon atoms, or alkoxy groups containing 1 to 6 carbon atoms; and
x, y and z are integers such that yz=2x.

2. A composition as claimed in claim 1 wherein the transition metal compound is titanium tetrachloride and the magnesium compound is magnesium cyclohexylcarboxylate.

3. A composition as claimed in claim 1 which further contains a Lewis Base compound.

4. A composition as claimed in claim 3 wherein the Lewis Base is of the general formula $$R^1{}_a Ar(COOR^2)_b$$

wherein
Ar is an aromatic hydrocarbon radical;
$R^1$ is a hydrocarbon radical, a halohydrocarbon radical, a halogen atom or a group $OR^3$;
$R^2$ is a hydrocarbon radical or a halohydrocarbon radical;
$R^3$ is a hydrocarbon radical or a halohydrocarbon radical;
a is zero or an integer; and
b is an integer.

5. A composition as claimed in claim 4 wherein the Lewis Base compound is a di-ester of phthalic acid.

6. A process for the production of a transition metal composition as claimed claim 1 which comprises reacting, at a temperature of at least 50° C., a compound of a transition metal of Group IVA, VA or VIA of the Periodic Table with a magnesium compound of the general formula:

$$Mg_x[R(COO)_y]_z.$$

7. A polymerisation catalyst which comprises
(A) a transition metal composition as claimed in claim 1,
(B) an organic compound of aluminium or of a metal of Group IIA of the Periodic Table.

8. A catalyst as claimed in claim 7 which further contains a Lewis base in addition to any present in component (A).

9. A catalyst as claimed in claim 8 which comprises an organic silicon compound containing one or more Si—OR⁴ Si—OCOR⁴ or Si—NR⁴ bonds wherein R⁴ is a hydrocarbon radical which may be substituted with one or more halogen atoms and/or oxyhydrocarbon groups.

10. A catalyst as claimed in claim 9 wherein component A contains an ester of phthalic acid, component (B) is an aluminium trihydrocarbyl compound and the catalyst also includes an organic silicon compound containing one or more Si—OR⁴, Si—OCOR⁴ or Si—NR⁴ bonds wherein R⁴ is a hydrocarbon radical which may be substituted with one or more halogen atoms and/or oxyhydrocarbon groups.

* * * * *